June 30, 1970 R. J. WHITSEL 3,517,639
PURE FLUID ANNUNCIATOR
Filed July 8, 1968

INVENTOR.
RONALD J. WHITSEL
BY
*Arthur L. Collins*
ATTORNEY 3,517,639
PURE FLUID ANNUNCIATOR
Ronald J. Whitsel, Southampton, Pa., assignor to the United States of America as represented by the Secretary of the Navy
Filed July 8, 1968, Ser. No. 743,137
Int. Cl. G01f 23/00; G01l 7/18
U.S. Cl. 116—118                    8 Claims

ABSTRACT OF THE DISCLOSURE

A fluid annunciator having a U-shaped tube initially filled with a liquid covering the hypotenuse of a right-angle prism interposed in one leg of the tube. Application of a pressure signal into the one leg of the tube causes the liquid to fall and expose the hypotenuse to the air whereby light incident normally on one diagonal face of the prism will be reflected from the hypotenuse through the other diagonal face indicating the presence of the pressure signal.

---

The invention relates particularly to a digital display device containing no moving parts for use in fluidic system to annunciate a change in pressure in a portion of the system, and preferably to be employed in decompression chambers or the like and in the main propulsion machinery of ships.

In the past, display devices or annunciators for fluidic systems depended on some mechanical linkage, sliding pistons or elastic diaphragms for actuation of the display. These devices all involved some moving parts and therefore were subject to the forces of friction and failure or degradation of performance during long term cyclic motion. Close fitting metallic parts and small orifices, inherent to current state of the art devices, are also subject to fouling or sluggish response due to particulate matter and hydrocarbons in the fluid used. These undesirable characteristics could also contribute the pseudo-indications and subsequent possible failure of the entire display system. In addition, some display devices employ transducers to sense the presence of a predetermined condition to then signal and actuate the display device. For the sake of simplicity and reliable maintenance free operation over long periods of time, it would be desirable to eliminate the energy transformation inherent in the transducer devices. Also, because the above mentioned mechanical devices have some moving parts, they are inherently limited in their application in areas where high temperatures and excessive shock and vibration are present.

It is therefore an object of the present invention to provide a novel and improved pure fluid annunciator which is not subject to wear and deterioration over long periods of operation and which can withstand excessive temperatures, shock and vibration.

It is a further object of the present invention to provide a novel and improved pure fluid annunciator for use with a fluidic logic system, containing no moving parts and which is compatible with the working fluid in the fluidic logic system.

It is another object of the present invention to provide a novel and improved pure fluid annunciator which is relatively simple in construction and yet highly accurate and reliable in use.

Figure 2A:
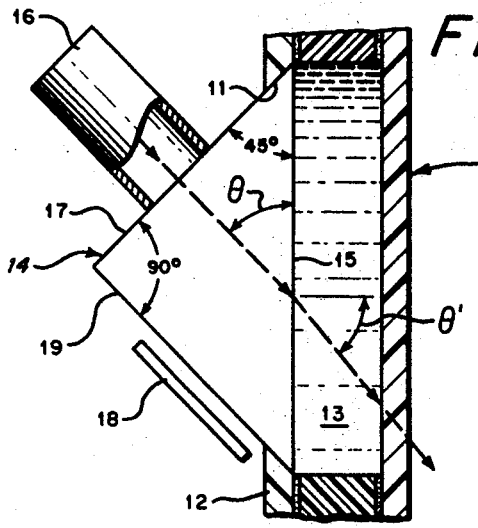
Figure 1:
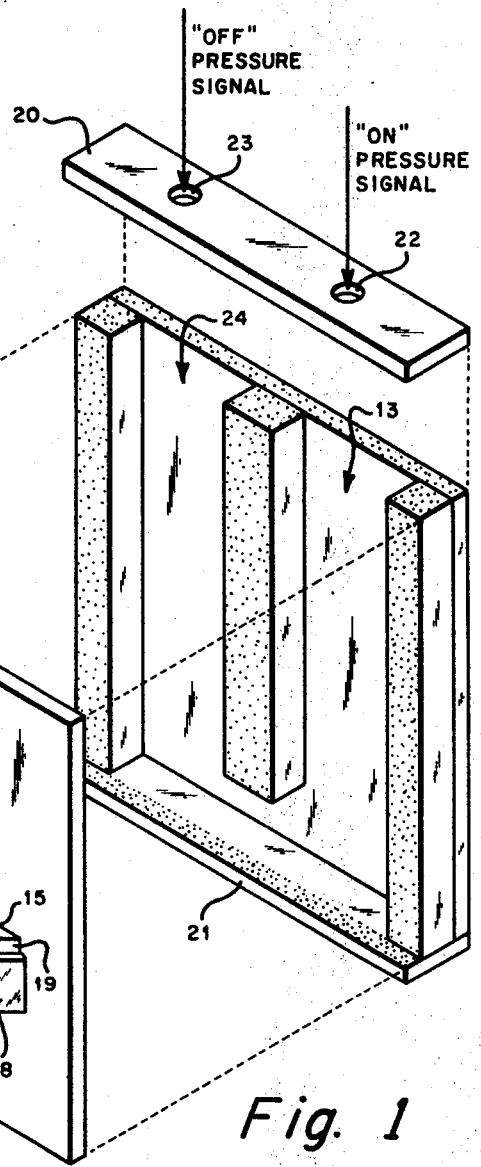
Figure 2B:
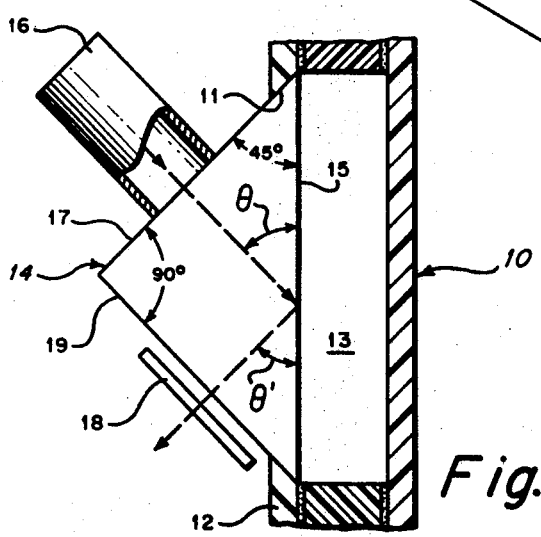

Other objects and many of the attendant advantages of this invention will be readily appreciated as the same becomes better understood by reference to the following detailed description when considered in connection with the accompanying drawing wherein:

FIG. 1 of the drawing is an exploded perspective view of the preferred embodiment of the invention; and FIGS. 2a and 2b of the drawing are sectional top views of a portion of the inventive device showing in diagrammatic form the transmission of light rays in accordance with the invention.

Referring now to the details of the drawing, wherein like reference numerals apply to like parts throughout, it will be noted that 10 designates a U-shaped fluid chamber which is preferably constructed from clear Plexiglas (Rohm and Haas Co.) fastened together with a suitable adhesive, or which may be constructed of any other suitable conventional material such as, for example, a solid piece of aluminum with the chambers being milled and drilled. The chamber 10 has a substantially rectangular opening 11 provided on its front face 12 opposite and opening into one of the legs 13 of said chamber 10.

A glass right-angle prism 14, whose hypotenuse or diagonal face 15 has the same dimensional shape as the opening 11, is adapted to fit in said opening and thereby form a portion of the internal surface of the leg 13. A concentrated light source 16 is positioned adjacent the prism 14 to allow its rays to be normally incident on the perpendicular face 17 of the prism. The light source 16 may obtain its illumination from any suitable low power source having a comparatively long operating life, for example, such as a flashlight bulb or a neon or fluorescent lamp. A display window 18 is preferably mounted on the other perpendicular face 19 of the prism 14, whose operation will become more apparent hereinafter. The top and bottom of the chamber 10 are sealed by the surfaces 20 and 21 respectively. The top surface 20 has a pair of pressure ports or passageways 22 and 23 extending into the legs 13 and 24 respectively of the chamber 10. The ports 22 and 23 are provided to accept and introduce pressure signals into the respective legs of the chamber 10, as from a decompression chamber in a manner which will be more apparent hereinafter.

Referring now more particularly to FIGS. 2a and 2b, in operation, the chamber 10 is initially filled with a volume of liquid sufficient to completely cover the diagonal face 15 of the prism 14. In this condition, the "OFF" condition, no pressure signal is being received by the port 22 and all light rays entering the prism normally from the light source 16 are being transmitted through the prism and are refracted at the diagonal face 15 (FIG. 2a), with none of the light rays being reflected through the perpendicular face 19 to illuminate the display window 18.

The application of a pressure signal into the port 22 will cause the level of the liquid in the leg 13 of the chamber 10 to fall and uncover the diagonal face 15 of the prism 14, thereby exposing it to the air in the chamber 10. In this condition, the "ON" condition, the light entering normally from the light source 16 will be reflected from the diagonal face 15 and emerge from the perpendicular face 19 which will illuminate the display window 18 (FIG. 3). The display window 18 may have written symbols thereon or it may be constructed of a colored material or a photochromic material capable of changing color when exposed to light to visually notify operating personnel of the presence of a pressure signal.

It is to be understood that the light source 16 will remain energized at all times while the annunciator is in use and indication of a pressure signal depends on the changing liquid level to illuminate or extinguish the light in the display window 18. Since the light source 16 remains activated continuously, it is not subject to switching transients and current surges which tend to greatly reduce bulb or lamp life. A description of the principle on which this annunciator functions is as follows:

The light source 16 is positioned so as to be incident normally on the perpendicular face 17 of the right-angle prism 14. This means that the transmission of light rays will be incident on the diagonal face 15 at an angle of substantially 45°. Accordingly, Snell's law may be written $$n \sin \theta = n' \sin \theta' \quad (1)$$

where $n$ and $n'$ are the indices of refraction of the prism material and the medium present in the leg 13, respectively, and $\theta$ and $\theta'$ are the angles of incidence and refraction respectively. To find the critical angle, at which the refracted rays have an angle of 90°, that is, $\theta'=90°$, it would follow that Equation 1 would be $$\sin \theta_c = n'/n \quad (2)$$

where $\theta_c$ is the critical angle. For example, one of the embodiments of the inventive device was assembled with the glass prism 14 having an index of refraction of 1.5, while the liquid used in the chamber 10 initially covering the diagonal face 15 was water which has an index of refraction of 1.33. The critical angle $\theta_c$, from Equation 2, using the above mentioned mediums is equal to 62°. Therefore, since the angle of incidence $\theta$ is less than the critical angle ($\theta=45°$ for light rays incident normally on one of the perpendicular faces in a right angle prism), substantially all of the incoming light will be refracted through the diagonal face 15, thus causing no illumination of the display window 18 which indicates the absence of a pressure signal (FIG. 2).

The reception of a pressure signal at the port 22 will cause the water level in the leg 13 to fall thereby forming a glass-air interface at the diagonal face 15 of the prism 14. Since the index of refraction of air is approximately equal to 1.0, it follows from Equation 2 that the critical angle $\theta_c$ for this glass-air interface is equal to 42°. Since the incident angle $\theta$ of 45° is now greater than the critical angle, the light rays will be totally internally reflected from the diagonal face 15 and emerge from the perpendicular face 19 after undergoing a deviation of 90°, the reflection angle $\theta'$ being equal to the incident angle, 45°. The display window 18 is thus illuminated and thereby indicates an "ON" condition (FIG. 3).

As previously disclosed, the top surface 20 (FIG. 1) has a pair of pressure ports 22 and 23. When an "ON" pressure signal is received at the port 22, the liquid level in the leg 13 falls, thereby raising the liquid level in the other leg 24. If, when the "ON" pressure signal is no longer present at the port 21, another pressure signal, an "OFF" pressure signal, is received at the port 23, the preferred embodiment would be working in a push-pull arrangement. That is, the pressure signals are so arranged and connected that the pressure in one of the legs of the chamber 10 decreases when that in the other leg increases. This has the advantage of providing an almost instantaneous flip-flop from the "ON" to the "OFF" condition without the inherent delay which would be caused by the liquid falling naturally and seeking its own level. However, it is to be understood that the system will function properly relying on the operation of gravity to lower the liquid level without the addition of an "OFF" pressure signal and the embodiment of FIG. 1 is not to be so limited thereby.

It is to be noted that for refraction to occur in the "OFF" condition, the glass-liquid interface must have a critical angle of greater than 45°. Since the various kinds of glass have indices of refraction generally lying between 1.46 and 1.66, any liquid other than water may be utilized so long as its index of refraction is greater than 1.03 for the above mentioned lower value and greater than 1.17 for the higher index of refraction value. For example, the use of another liquid, such as one of the silicone fluids which have an index of refraction of approximately 1.4, would greatly reduce loss of liquid in the chamber 10 due to evaporation at extremely high temperatures. Also, since the glass-air interface has a critical angle of less than 45° for any type of glass chosen, reflection will always occur in the "ON" condition when the diagonal face of the prism is uncovered.

Obviously, many modifications and variations of the present invention are possible in the light of the above teachings. It is therefore to be understood that within the scope of the appended claims, the invention may be practiced otherwise than as specifically described.

What is claimed is:
1. A fluid annunciator comprising:
  (a) a U-shaped fluid chamber, one leg of the chamber having a substantially rectangular opening therein;
  (b) a right-angle prism interposed in the opening, the diagonal face of the prism forming an internal surface of the chamber;
  (c) a concentrated light source aligned so as to be incident normally on one of the perpendicular faces of the prism;
  (d) first pressure means connected to said one leg of the fluid chamber to apply a pressure signal therein;
  (e) and a liquid disposed in the fluid chamber initially covering the diagonal face of the prism, said liquid having an index of refraction wherein the prism-liquid interface will have a critical angle greater than 45° so that the incident light will be refracted through the diagonal face of the prism thereby indicating the absence of a pressure signal.

2. A fluid annunciator substantially as described in claim 1, wherein the liquid level in said one leg will fall and uncover the diagonal face of said prism when a pressure signal is applied, thereby exposing said diagonal face to the air in the fluid chamber, said prism-air interface having a critical angle less than 45° whereby the incident light will be reflected through the other perpendicular face of said prism.

3. A fluid annunciator, substantially as described in claim 2, wherein the prism is glass having an index of refraction between 1.46 and 1.66.

4. A fluid annunciator substantially as described in claim 3, wherein the liquid is water having an index of refraction of approximately 1.33.

5. A fluid annunciator substantially as described in claim 3, wherein the liquid is a silicone fluid having an index of refraction of approximately 1.4.

6. A fluid annunciator substantially as described in claim 2, wherein an indicating display window is mounted on the other perpendicular face of the prism.

7. A fluid annunciator, substantially as described in claim 6, wherein the indicating display window is constructed of a photochromic material.

8. A fluid annunciator substantially as described in claim 2, wherein a second pressure means is connected to the other leg of the fluid chamber to apply a pressure signal therein, said second means responsive to the absence of a pressure signal in said first means whereby a substantially instantaneous change of liquid level in said one leg occurs.

References Cited
UNITED STATES PATENTS

| | | | |
|---|---|---|---|
| 2,240,988 | 5/1941 | Hertel | 73—293 |
| 2,350,712 | 6/1944 | Barsties | 350—96 |
| 2,589,569 | 3/1952 | Peter et al. | 340—380 |
| 3,326,048 | 6/1967 | Benson et al. | 73—401 |
| 3,389,950 | 6/1968 | Harper | 350—179 X |
| 3,436,500 | 4/1969 | Culbert et al. | 73—401 X |

S. CLEMENT SWISHER, Primary Examiner

D. M. YASICH, Assistant Examiner

U.S. Cl. X.R.
73—401; 340—380